(12) United States Patent
Wettergard

(10) Patent No.: US 6,347,605 B1
(45) Date of Patent: Feb. 19, 2002

(54) MOISTENING DEVICE FOR THE INLET AIR OF COMBUSTION ENGINES

(75) Inventor: Jan Wettergard, Kungsängen (SE)

(73) Assignee: Munters Euroform GmbH, Aachen (DE)

(*) Notice: Subject to any disclaimer, the term of this patent is extended or adjusted under 35 U.S.C. 154(b) by 0 days.

(21) Appl. No.: 09/636,674

(22) Filed: Aug. 11, 2000

(30) Foreign Application Priority Data

Aug. 13, 1999 (DE) .......................... 199 38 356

(51) Int. Cl.$^7$ ............................ F02M 25/028
(52) U.S. Cl. ................... 123/25 B; 123/25 D
(58) Field of Search ............. 123/25 B, 25 D, 123/25 C, 25 A

(56) References Cited

U.S. PATENT DOCUMENTS

| | | | | |
|---|---|---|---|---|
| 1,443,414 A | * | 1/1923 | Johndon | 123/25 B |
| 4,003,969 A | * | 1/1977 | Robinson | 123/25 B |
| 4,166,435 A | * | 9/1979 | Kiang | 123/25 B |
| 4,466,386 A | * | 8/1984 | Silva | 123/25 D |
| 5,012,772 A | * | 5/1991 | Nakamura | 123/25 C |
| 5,758,606 A | * | 6/1998 | Rosen et al. | 123/25 B |
| 6,196,165 B1 | * | 3/2001 | Rosen et al. | 123/25 B |

* cited by examiner

*Primary Examiner*—Marguerite McMahon
(74) *Attorney, Agent, or Firm*—Herbert Dubno

(57) ABSTRACT

Described is a device for moistening the inlet air of internal combustion engines having a turbo-supercharger. The device comprises moistening means through which the inlet air and the moistening liquid flow and contact with one another. The moistening means is disposed upstream of the compressor of the turbo-supercharcher in flow direction of the inlet air. In the flow path of the inlet air upstream of the moistening means an air/air heat exchanger is disposed which serves for preheating the inlet air and which is flown through by the atmospheric inlet air and the moistened and compressed inlet air from the compressor.

5 Claims, 1 Drawing Sheet

MOISTENING DEVICE FOR THE INLET AIR OF COMBUSTION ENGINES

FIELD OF THE INVENTION

The present invention is directed to a device for moistening the inlet air of a combustion engine operating with air suction and having a cooling water circuit.

BACKGROUND OF THE INVENTION

It is known to moisten the inlet air of Diesel engines provided with turbo-supercharges in order to reduce the NOx portion in the exhaust gas in this manner. Such a method with a corresponding device is described in WO 95/23286. In this system, a moistening means is used which is traversed by the inlet air and water, wherein the inlet air is compressed prior to the moistening and the energy inherent in the cooling water or the exhaust gases of the combustion engine is used for preheating the water before the same is introduced into the moistening means.

The present invention is directed to internal combustion engines operating with air suction, i.e. without a turbosupercharger.

OBJECT OF THE INVENTION

It is the object of the invention to provide a device for moistening the inlet air of a combustion engine operating with air suction by means of which a NOx reduction in the exhaust gas of the combustion engine can be achieved in an especially simple manner at an especially low cost.

SUMMARY OF THE INVENTION

This object is attained by a device for moistening the inlet air of a combustion engine operating with air suction and having a cooling water circuit, said device comprising.
  a moistening means for the inlet air through which the inlet air and the moistening liquid flow in contact with one another, and
  an air/water heat exchanger or air/air heat exchanger serving for the preheating of the inlet air, disposed upstream of the moistening means and traversed by the cooling water or by the exhaust gas of the combustion engine and by the inlet air.

The invention is particularly directed to Diesel engines or gas engines which, however, does not exclude the use of the invention with other combustion engines.

A plurality of old combustion engines which are in operation do not have turbo-superchargers but generate exhaust gases having a relatively high NOx portion. This is especially true for smaller Diesel engines of ships, boats, generators etc. Since in many cases these combustion engines were constructed with the intent to use them at a maximum capacity the NOx emissions are high. Normally, such combustion engines have a cooling circuit in which water (fresh water) circulates.

The present invention emanates from the principle of preheating the inlet air for the combustion engine, namely by utilization of the thermal energy inherent in the cooling water or the exhaust gas of the combustion engine, and thereafter to moisten the preheated inlet air. The thermal energy inherent in the cooling water is transferred to the inlet air by means of an air/water heat exchanger. The inlet air is heated to a temperature of 60–70° C. which represents an ideal temperature range for the following moistening step. Addition of moisture of about 30 g per kg dry air can be obtained in a simple manner without great cost in order to substantially reduce the NOx formation in the exhaust gas.

The preheated inlet air entering the moistening means is moistened by the moistening liquid and cooled within the same. Preferably, the moistening means is used as described in the above-mentioned WO 95/23286 (U.S. Pat. No. 5,758, 606) or in the non-published German patent application 197 50 181.8 wherein an opposite flow, cross flow and/or parallel flow of the media is possible.

Preferably the air/water heat exchanger and the moistening means are disposed upstream of the air filter of the combustion engine. By this, the real air filter is less loaded. Of course, a location of the air/water heat exchanger and the moistening means downstream of the air filter is also possible.

Another embodiment of the invention which is especially used with Diesel engines of ships is characterized by the feature that the moistening liquid is normal salt water (sea water). Normally, such Diesel engines on ships are associated with a sea water circuit which is used for cooling the cooling water of the Diesel engine by means of a heat exchanger wherein the cooling water is normally fresh water. Now, according to the invention salt water can be taken from the existing salt water circuit and can be fed to the moistening means. In the same the salt water is contacted with the preheated inlet air in order to moisten the inlet air. The salt water leaving the moistening means again can be discharged or recirculated into the supply line of the moistening means again. With this embodiment according to which the salt water for moistening is taken from a present salt water circuit serving for cooling the cooling water, the salt water is slightly heated by the thermal energy transferred from the cooling water of the combustion engine so that slightly preheated salt water in the moistening means contacts the preheated air.

Of course, the salt water need not be taken from an existing salt water circuit. The moistening water can be taken directly form the sea (with ships, boats) as well.

The above-described embodiment has the advantage that no additional fresh water is required for the moistening, thereby avoiding additional expense, especially on ships. Of course, this does not exclude the normal use of fresh water (river water).

With the inventive solution the moistening of the inlet air is carried out adiabatically.

If, according to the invention, the exhaust gas of the combustion engine is used for preheating the inlet air and an air/air heat exchanger is used the exhaust gas or a part thereof can directly flow through the air/air heat exchanger. However, for instance, the exhaust gas can also pass a second heat exchanger in which air is heated which is fed to the air/air heat exchanger for heating the inlet air and is recirculated from there to the heat exchanger traversed by the exhaust gas. Also in this manner the existing energy is utilized for preheating the inlet air. Moreover, the same is true for the preheating by means of the cooling water.

According to the invention an intended heating of the moistening medium (water) is not carried out.

According to another embodiment of the invention a plurality of air/water or air/air heat exchanger/moistening units are disposed one behind the other in flow direction of the inlet air. With this embodiment an especially exact control of the amount of the admission of moisture of the inlet air can be carried out, for example, in respect to the actual water temperature.

Preferably, the device according to the invention has means for separating the foreign particles entrained by the inlet air. Such a means is used especially if salt water is used as moistening medium.

BRIEF DESCRIPTION OF THE DRAWING

In the following the invention is discussed in detail with reference to two embodiments in connection with the drawing. In the drawing.

SPECIFIC DESCRIPTION

Figure 1:
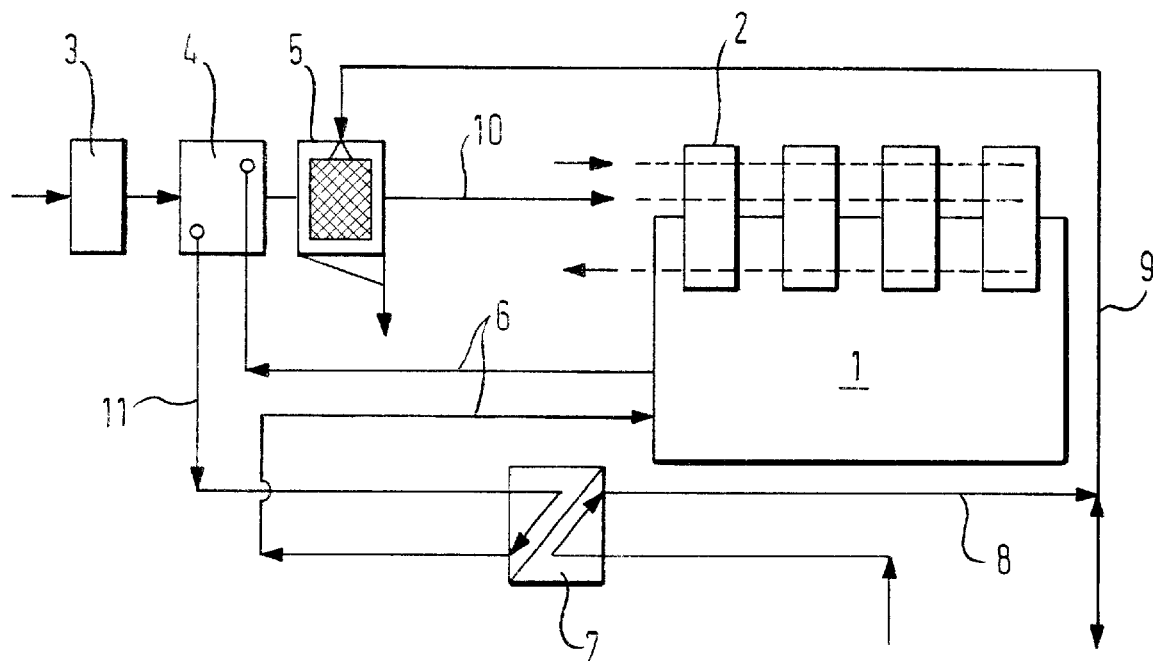
FIG. 1 shows a schematic representation of a ship Diesel engine operating with air suction which is provided with a device for moistening the inlet air.

The ship Diesel engine shown in FIG. 1 has four cylinders 2 and operates with air suction, i.e. the engine is not provided with a compressor or turbo-supercharger. The air intakes leading to the respective cylinders 2 are not shown in detail. The flow path 10 of the inlet air has, however, been indicated. The inlet air passes through an air filter 3 on its way into the cylinder of the combustion engine and also through an air/water heat exchanger 4 and a moistening means 5.

The Diesel combustion engine 1 includes a cooling water jacket from which a cooling water circuit shown at 6 branches off. The cooling water leaving the cooling water jacket enters into the air/water heat exchanger 4 wherein it flows through the heat exchanger in suitable pipe coils. The cooled cooling water leaves the heat exchanger 4 through a conduit 11 and flows into a water/water heat exchanger 7. In this heat exchanger the cooling water is cooled by sea water flowing in a sea water circuit 8. The cooled cooling water flows from the heat exchanger 7 back into the cooling water jacket of the combustion engine 1.

By the thermal energy inherent in the cooling water the inlet air, after having passed the air filter 3, is preheated in the heat exchanger 4, for instance, to a range of 60–70° C. The preheated air, after having flown around the cooling water pipe coils in the heat exchanger 4, leaves the heat exchanger 4 and flows horizontally through a moistening means 5 containing a plurality of packings. The moistening means 5 is traversed vertically by sea water (salt water) which is supplied to the upper side of the moistening means 5 by means of a branch conduit 9 from the sea water circuit 8 and is sprayed there onto the pickings disposed within the moistening means 5 by means of an appropriate spraying means. When passing the moistening means 5 the preheated inlet air takes up moisture, leaves the moistening means 5 horizontally and flows through the respective intake port into the cylinder 2 of the Diesel engine. The salt water flowing out at the lower end of the moistening means 5 can be discharged or recirculated into the conduit 9 again.

With the above-described embodiment the heat exchanger 7 is present anyhow in order to cool the cooling water (fresh water) of the combustion engine. For moistening the inlet air only the heat exchanger 4, the moistening means 5 and corresponding conduits, pumps are necessary to circulate the cooling water through the heat exchanger and to direct the sea water from the existing sea water circuit into the moistening means 5. Accordingly, the device is constructed in a simple manner and utilizes the thermal energy inherent in the cooling water for preheating the inlet air and the sea water existing in the sea water circuit 8 for moistening the inlet air.

Figure 2:
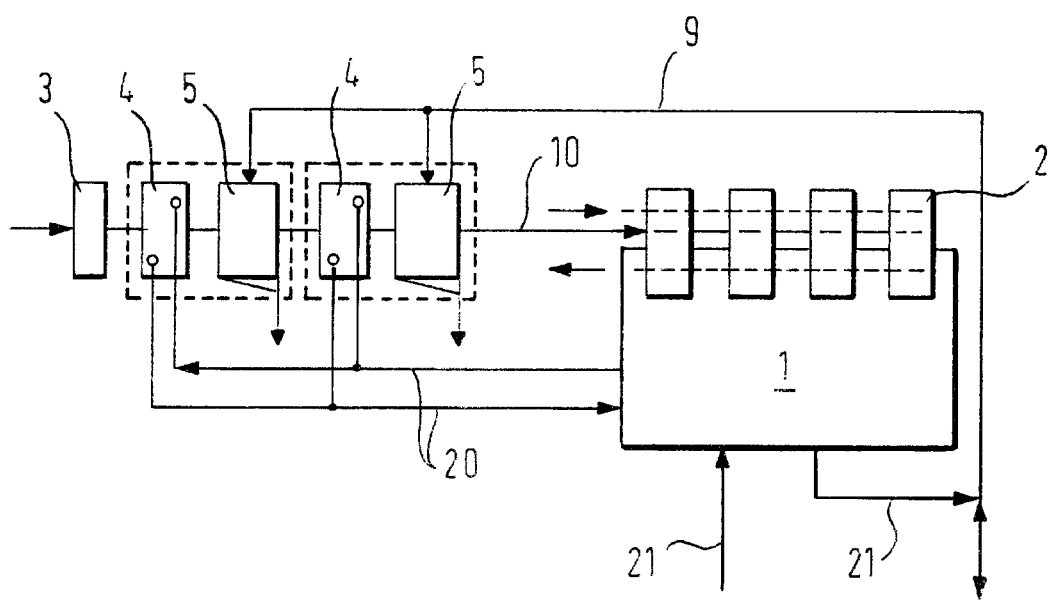
FIG. 2 shows a schematic representation of a ship Diesel engine which is provided with a second embodiment of device for moistening the inlet air.

In the embodiment of FIG. 2 identical parts are provided with the same reference numbers as in FIG. 1. This embodiment differs from the embodiment of FIG. 1 substantially by the feature that here two units each consisting of an air/water heat exchanger and a moistening means re disposed one behind the other in the flow path of the inlet air. Furthermore, it is different with regard to the embodiment of FIG. 1 that according to the embodiment of FIG. 2 the combustion engine is cooled with sea water so that in this case sea water and thus salt water is used for preheating the inlet air.

In the embodiment of FIG. 2, the inlet air passes along its flow path 10 through an air filter 3 and two units each consisting of an air/water heat exchanger 4 and a following moistening means 5. In this case the inlet air is preheated in the first heat exchanger 4 (shown at the left side in the figure) and is moistened with salt water 9 from the salt water circuit 21 in the following moistening means 5. The air leaving the first moistening means 5, now cooled again, enters into the second heat exchanger 4 and is preheated there whereafter it passes the second moistening means 5 which is also supplied with salt water from the conduit 9. Thereafter, it flows into the individual cylinders 2 of the ship Diesel engine 1 through the intake pipes.

According to this embodiment the inlet air is not only preheated by salt water but also moistened by salt water. The combustion engine 1 has a cooling water jacket which is traversed by salt water originating from a sea water circuit 21. A cooling water circuit 20 branches from the cooling water jacket and supplies the two heat exchangers 4 with hot cooling water. The cooled cooling water flows through the circuit 20 back into the cooling water jacket of the sea water circuit 21.

With the embodiment shown in the figures transport means, as pipes, pumps, are now shown in detail.

According to another embodiment of the invention the air is only partly moistened. Thereafter, the moistened air and dry air are mixed again. In order to control the portion of the moistened air preferably an appropriate control means is provided. The control can be carried out manually or automatically, for instance in response to the temperature of the cylinder block etc. This control means can control an appropriate valve (mixing flap) mixing the moistened air with the dry air in corresponding portions. Such a part-moistening has the advantage that the device can be designed smaller on the whole.

According to still another embodiment of the invention the provided heat exchanger is controlled in response to the load of the combustion engine. In this case the heat exchanger can be bypassed by a bypass-conduit. The control can be carried out in such a manner, for instance, that no heating takes place when the combustion engine is idle running.

What is claimed is:

1. An air intake system for an internal combustion engine comprising:
    an internal combustion engine having a suction air intake for a plurality of cylinders and traversed by at least a main flow of air drawn by suction to said cylinders, and a water-cooling path for cooling said engine;
    an air filter at an upstream location along said air intake and traversed by said main flow of air;
    a heat exchanger downstream of said air filter along said air intake and traversed by said main flow of air and heated by heat from said engine for heating said main flow of air;
    a moistening device downstream of said heat exchanger along said air intake and traversed by said main flow of air heated in said heat exchanger, said moistening device comprising a plurality of packings traversed by said main flow of air; and means for passing a liquid capable of moistening said main flow of air into contact with said main flow of air and said packings in counterflow, parallel flow or crossflow to said main flow of air.

2. The air intake system defined in claim 1 wherein said heat exchanger is an air-water heat exchanger supplied with water from said water-cooling path.

3. The air intake system defined in claim 1 wherein said means for passing said liquid is a means for supplying sea water to said packings.

4. The air intake system defined in claim 3 wherein said engine is cooled at least in part with sea water and the sea water supplied to the packings is branched from sea water used to cool said engine.

5. The air intake system defined in claim 1 wherein a plurality of heat exchanger/moistening device pairs of said heat exchanger and said moistening device are provided along said air intake for said main flow of air between said filter and said engine.

\* \* \* \* \*